US012579107B2

(12) United States Patent
Jain et al.

(10) Patent No.: US 12,579,107 B2
(45) Date of Patent: Mar. 17, 2026

(54) AUTOMATED DUPLICATE CONTENT DETECTION AND RESOLUTION IN DOCUMENT REPOSITORIES

(71) Applicant: INTUIT INC., Mountain View, CA (US)

(72) Inventors: Siddharth Jain, Mountain View, CA (US); Sivashanker Thiruchittampalam, Toronto (CA); Jonathan Lin, Ontario (CA); Venkat Narayan Vedam, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/746,173

(22) Filed: Jun. 18, 2024

(65) Prior Publication Data

US 2025/0384012 A1      Dec. 18, 2025

(51) Int. Cl.
*G06F 16/00* (2019.01)
*G06F 16/174* (2019.01)
*G06F 16/31* (2019.01)
*G06F 16/383* (2019.01)

(52) U.S. Cl.
CPC ........ *G06F 16/1748* (2019.01); *G06F 16/322* (2019.01); *G06F 16/383* (2019.01)

(58) Field of Classification Search
CPC ... G06F 16/1748; G06F 16/322; G06F 16/383
See application file for complete search history.

(56) References Cited

U.S. PATENT DOCUMENTS

| | | | | |
|---|---|---|---|---|
| 10,268,735 | B1* | 4/2019 | White ................. | G06F 16/9024 |
| 10,423,495 | B1* | 9/2019 | Guo .................... | G06F 11/1453 |
| 10,956,673 | B1* | 3/2021 | Ramezani ............. | G06F 40/284 |
| 2008/0208567 | A1* | 8/2008 | Brockett ............... | G06F 40/253 |
| | | | | 704/9 |

(Continued)

OTHER PUBLICATIONS

Leitão, Luís et al. Efficient and Effective Duplicate Detection in Hierarchical Data. IEEE Transactions on Knowledge and Data Engineering, vol. 25, No. 5, pp. 1028-1041 [online], [retrieved on Mar. 6, 2025]. Retrieved from the Internet <URL: https://ieeexplore. ieee.org/document/6171189> (Year: 2016).*

*Primary Examiner* — Syed H Hasan
(74) *Attorney, Agent, or Firm* — Patterson + Sheridan, LLP

(57) ABSTRACT

Aspects of the present disclosure relate to automated detection of duplicate entities in a repository. Embodiments include generating a vector representation of a given entity; comparing the vector representation of the given entity to vector representations of a plurality of entities within a repository to determine a level of similarity for the given entity relative to each of the plurality of entities; selecting a similarity threshold of a set of similarity thresholds for the given entity and a particular entity based on a hierarchical relationship between the given entity and the particular entity, wherein the set of similarity thresholds comprises a sibling threshold, a parent-child threshold, and an ancestor threshold; and determining that the given entity is a duplicate of the particular entity based on a level of similarity between the given entity and the particular entity exceeding the selected similarity threshold.

18 Claims, 5 Drawing Sheets

(56)                  References Cited

U.S. PATENT DOCUMENTS

| | | | |
|---|---|---|---|
| 2010/0174670 A1* | 7/2010 | Malik | G06F 18/231 |
| | | | 706/12 |
| 2020/0364199 A1* | 11/2020 | Engrav | G06Q 10/06314 |
| 2021/0342352 A1* | 11/2021 | Stuart | G06F 16/9024 |
| 2022/0335026 A1* | 10/2022 | Park | G06F 16/9024 |
| 2022/0391365 A1* | 12/2022 | Bremer | G06F 16/9024 |
| 2023/0030086 A1* | 2/2023 | Martinez Ayala | G06F 16/367 |
| 2023/0169442 A1* | 6/2023 | Grob | G06N 3/048 |
| | | | 705/28 |

* cited by examiner

400

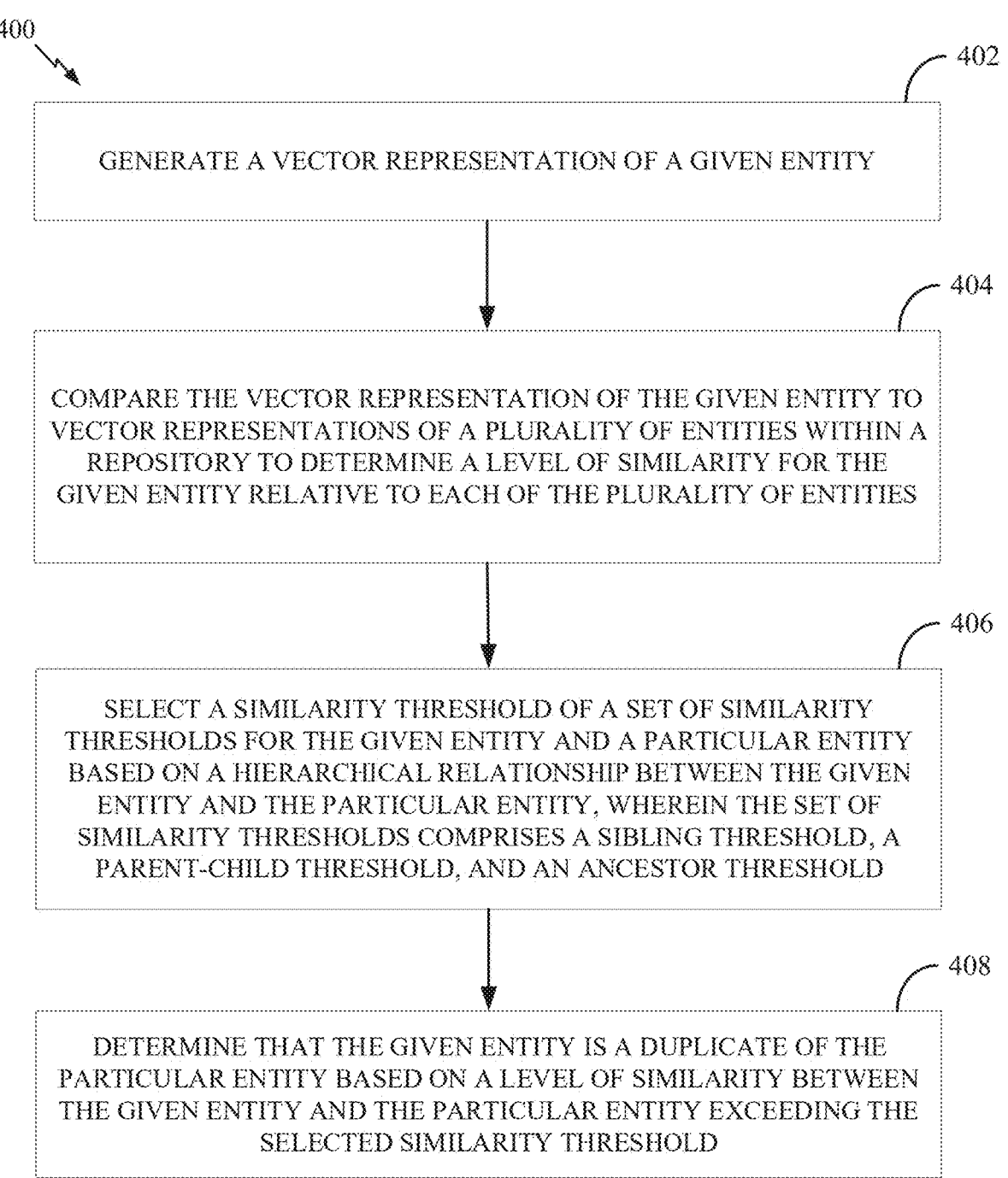

402

GENERATE A VECTOR REPRESENTATION OF A GIVEN ENTITY

404

COMPARE THE VECTOR REPRESENTATION OF THE GIVEN ENTITY TO VECTOR REPRESENTATIONS OF A PLURALITY OF ENTITIES WITHIN A REPOSITORY TO DETERMINE A LEVEL OF SIMILARITY FOR THE GIVEN ENTITY RELATIVE TO EACH OF THE PLURALITY OF ENTITIES

406

SELECT A SIMILARITY THRESHOLD OF A SET OF SIMILARITY THRESHOLDS FOR THE GIVEN ENTITY AND A PARTICULAR ENTITY BASED ON A HIERARCHICAL RELATIONSHIP BETWEEN THE GIVEN ENTITY AND THE PARTICULAR ENTITY, WHEREIN THE SET OF SIMILARITY THRESHOLDS COMPRISES A SIBLING THRESHOLD, A PARENT-CHILD THRESHOLD, AND AN ANCESTOR THRESHOLD

408

DETERMINE THAT THE GIVEN ENTITY IS A DUPLICATE OF THE PARTICULAR ENTITY BASED ON A LEVEL OF SIMILARITY BETWEEN THE GIVEN ENTITY AND THE PARTICULAR ENTITY EXCEEDING THE SELECTED SIMILARITY THRESHOLD

FIG. 4

AUTOMATED DUPLICATE CONTENT DETECTION AND RESOLUTION IN DOCUMENT REPOSITORIES

INTRODUCTION

Aspects of the present disclosure relate to techniques for automatically detecting duplicate entities in repositories and assisting users in avoiding duplication. In particular, techniques described herein involve comparing entities based on the hierarchical relationship between the entities using relationship-specific thresholds that are dynamically generated by a machine learning model that may be retrained in response to user feedback.

BACKGROUND

Every year, millions of people, businesses, and organizations around the world utilize repositories to store and access entities such as electronic documents. Repositories are generally any electronically-stored collection of written information, such as databases, data sets, computer programs, websites, and/or the like. For example, a repository may comprise a website where an organization may store electronic records such that the records can be viewed by users.

Repositories may contain duplicate entities. For instance, a first entity and a second entity may be identical copies or otherwise similar to the point of redundancy. With large repositories, detecting such duplicate entities may be difficult or even impossible. As an example, datasets used to train machine learning models may be repositories that include millions of documents. Manual duplicate detection for such repositories is not practical. Furthermore, existing automated techniques for detecting duplicate entities fail to account for hierarchical relationships among entities, which may result in incorrect determinations (e.g., similarity across different hierarchical levels may not always indicate duplicate or redundant entries). By failing to adapt to hierarchical relationships that are specific to particular repositories, existing automated techniques for identifying duplicate entities may produce inaccurate results (e.g., misclassifying useful entities as duplicates or failing to recognize duplicate entities).

Thus, there is a need in the art for improved techniques for automated recognition of duplicate entities.

BRIEF SUMMARY

Certain embodiments provide an automated method of detecting duplicate entities in a repository. The method generally includes: generating a vector representation of a given entity; comparing the vector representation of the given entity to vector representations of a plurality of entities within a repository to determine a level of similarity for the given entity relative to each of the plurality of entities; selecting a similarity threshold of a set of similarity thresholds for the given entity and a particular entity based on a hierarchical relationship between the given entity and the particular entity, wherein the set of similarity thresholds comprises a sibling threshold, a parent-child threshold, and an ancestor threshold; and determining that the given entity is a duplicate of the particular entity based on a level of similarity between the given entity and the particular entity exceeding the selected similarity threshold.

Other embodiments provide processing systems configured to perform the aforementioned method as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 4 depicts example operations related to automated recognition of duplicate entities.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
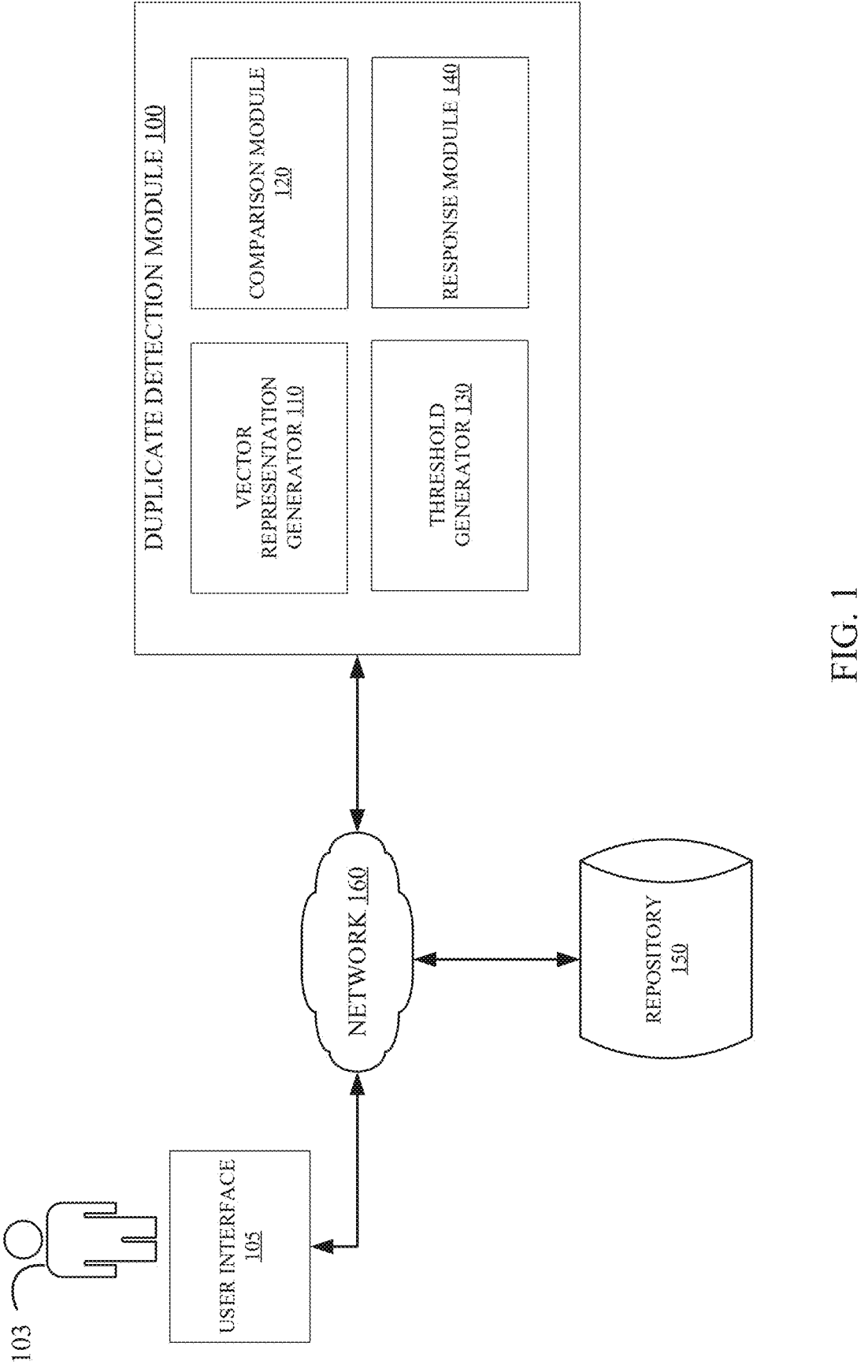
FIG. 1 depicts an example of computing components related to automated recognition of duplicate entities.

Aspects of the present disclosure provide apparatuses, methods, processing systems, and computer-readable mediums for automatically detecting duplicate entities in a repository.

According to certain embodiments, entities in a repository (such as documents) are compared based on the hierarchical relationship between the entities. For instance, using an automated semantic similarity comparison for different entities in a repository without accounting for hierarchical relationships may result in a determination that entities at different levels of a repository hierarchy are duplicates when, in some cases, having entities at different levels of the hierarchy that are similar to one another may be important for the structure of the repository. For example, if two entities have a parent-child relationship, the child entity may add important context to the parent entity even if the two entities are highly similar. However, in cases where two entities have a sibling relationship (e.g., the entities are linked to a common parent entity), similarity between the two entities may indicate redundancy.

Techniques described herein address this technical challenge by performing an automated hierarchy-aware comparison process that involves generating vector representations of the entities (e.g., embedding representations) and comparing the vector representations to determine a degree of similarity. A similarity threshold may be selected for the entities based on the hierarchical relationship between the entities. Similarity thresholds for each hierarchical relationship (e.g., sibling, parent-child, and ancestor) may be determined by a trained machine learning model or may otherwise be determined based on data associated with a repository. For example, a machine learning model may generate thresholds for a repository based on labeled training data associated with the repository (and/or associated with one or more other related repositories), and/or the thresholds may be configured and/or adjusted upward or downward based on labeled training data without the use of a machine learning model. If the similarity of two entities exceeds a threshold determined for the entities (e.g., a hierarchical relationship specific threshold), one or both of the entities may be determined to be duplicates. In some embodiments, a response may be generated and provided to a user of the repository who is associated with an entity (e.g., the user who submitted the entity to the repository) that was determined to be a duplicate of another entity within the repository. The response may comprise suggestions for editing the entity to avoid redundancy. Certain embodiments provide that a machine learning model that generates the thresholds may be retrained based on user feedback and/or the thresholds themselves may be adjusted based on user feedback.

Certain embodiments provide that a repository, such as a data store, contains entities. Entities may comprise any form of electronically stored written information. For example, entities may be documents or software items such as query language objects and types. The repository may store the entities in a hierarchical manner. For instance, entities may be arranged as a grouping of nodes within the repository. Nodes are generally data structures such as linked lists or data trees. In some embodiments, the nodes of the repository may be arranged in a tree structure. Multiple child nodes may be connected to a given parent node, and the parent node may be a child node to another node. As an example, the home page of a website may be the parent node to multiple child nodes, such as pages of the website that are linked within the home page. These child nodes may be parent nodes to other linked items, such as a document within one of the linked pages. In this example, the home page would be an ancestor node to the document within the linked page.

Certain embodiments provide that the entities may be software items, such as query language objects and types. Software items may be nested within one another in a hierarchical manner (e.g., a main file may contain a function that is contained within a separate file, and the function may use an item that is contained within another separate file).

In some embodiments a vector representation is generated for a given entity. The given entity may be an entity within the repository, or it may be an entity provided by a user (e.g., when a user attempts to submit a document to the repository). The vector representation may be an embedding representation of the entity. An embedding generally refers to a vector representation of an entity that represents the entity as a vector in n-dimensional space such that similar entities are represented by vectors that are close to one another in the n-dimensional space. Embeddings may be generated through the use of an embedding model, such as a neural network or other type of machine learning model that learns a representation (embedding) for an entity through a training process that trains the neural network based on a data set, such as a plurality of features of a plurality of entities.

Some embodiments provide that the vector representation of the given entity is compared to vector representations of a plurality of entities within the repository to determine a level of similarity for the given entity relative to each of the plurality of entities. This comparison may be performed by calculating the dot product between two embedding vectors, determining the cosine similarity, Jaccard similarity, Euclidean distance, or Levenshtein distance between two embedding vectors, using other types of semantic similarity algorithms, or using other techniques for comparing two vectors as known in the art. Such comparison may allow for determining a level of semantic similarity between two entities.

Certain embodiments provide that the similarity metric may be chosen based on the type of entity and the type of repository. For example, for text-based entities such as documents, cosine similarity may be used to determine the level of similarity between the entities. For entities represented by sets of attributes (e.g., tags and metadata), Jaccard similarity may be used. For entities that may be represented by binary vectors, Hamming distance may be used.

According to some embodiments, a similarity threshold may be selected for determining whether the given entity is a duplicate of a second entity. The similarity threshold may be selected based on the hierarchical relationship between the entities. For example, if the given entity is a parent node to the second entity (or if the second entity is a parent node to the given entity), a parent-child similarity threshold may be selected for comparing the entities. If the given entity and the second entity share a common parent node, a sibling threshold may be used. If the given entity is higher in the hierarchy than the second entity (such that the second entity is a "descendant" of the given entity) but is not a parent node of the second entity (e.g., the given entity is a parent node to the parent node of the second entity, and so on), an ancestor threshold may be used. Likewise, if the second entity is higher in the hierarchy than the given entity but is not a parent node of the given entity, the ancestor threshold may be used. In instances where a repository lacks hierarchical structure, a sibling threshold (or another default threshold) may be used for all entities.

According to certain embodiments, a hierarchical structure for a repository may be derived even when a hierarchical structure is not explicitly set for the repository. For example, a hierarchy may be determined based on the relationship between entities in the repository (e.g., one entity references another entity) even if the entities are not arranged hierarchically within the repository. As another example, entities within a repository may be assigned hierarchical relationships relative to other entities and duplicate entities may be detected based on the assigned relationships.

In certain embodiments, the thresholds are generated by a machine learning model such as a large language model (LLM). The machine learning model may be trained through a supervised learning process to determine similarity thresholds that are effective for detecting duplicate entities based on the hierarchical relationship between the entities. For example, a training data set may comprise a hierarchical repository of entities with duplicate entities labeled as duplicates (or labeled as near-duplicates, or otherwise close enough to being duplicates that one of the entities should be removed from the repository). In some embodiments, entities may be labeled as near-duplicates. Near-duplicates may be treated differently than duplicates or unique entities (e.g., a near-duplicate may be flagged for further review instead of rejected from the repository). Vector representations of a plurality of the entities within the training data set may be created, a level of similarity may be determined between entities of the plurality of entities, and the machine learning model may generate a prediction as to whether two entities are duplicates based on the determined level of similarity between the two entities. Parameters of the machine learning model (and/or the thresholds) may be adjusted based on the hierarchical relationship between the entities and the variance between the predictions and the labels. For example, if a prediction indicates that two entities having a parent-child relationship are duplicates when the labels indicate that the entities are not duplicates, the machine learning model may be retrained such that it will be less likely to predict that entities with a parent-child relationship are duplicates (and/or the machine learning model may adjust the threshold). As another example, if a prediction indicates that two entities having a sibling relationship are not duplicates when the labels indicate that the entities are duplicates, the machine learning model may adjust the sibling threshold and/or be retrained such that it will be more likely to predict that entities with a sibling relationship are duplicates. In some embodiments, the thresholds may be adjusted based on the training data set without the use of a machine learning model (e.g., a threshold may be iteratively adjusted based on variances between detected duplicates and labels in the training data).

Some embodiments provide that a machine learning model used to create embedding representations of entities may be trained through a supervised learning process as described above. Training the embedding model may comprise iteratively adjusting parameters of the embedding model or otherwise reconfiguring the model to generate embeddings of entities that are optimized for detecting duplicate entities. For example, the training data may indicate that the embeddings generated by the embedding model lead to false positives or false negatives in detecting duplicate entities. The embedding model may be retrained based on comparing the level of similarity determined based on the embeddings to labels that indicate whether entities are actually duplicates. Retraining an embedding model may comprise adjusting the granularity at which the model creates embeddings (e.g., adjusting the number of words/characters covered by each embedding).

In certain embodiments, based on a determination that two entities are duplicates, one or more actions may be taken to assist a user. For example, the user may be provided with an indication that the entities are duplicates, such as by flagging one or more entities for review. Some embodiments provide that the user may be provided with suggestions for resolving the duplication. As an example, the suggestions may include deleting one of the entities. The suggestions may include an indication of which portions of an entity are duplicated and which portions are unique, as well as instructions to delete one or more of the duplicate portions or otherwise modify the entity. The suggestions may be generated by a machine learning model such as an LLM. In some embodiments, the suggestions may be generated by populating a prompt template. For instance, the prompt template may be populated based on the detected duplicates and/or the similarity comparison, and the prompt may be provided to the LLM.

Certain embodiments provide that a user may submit one or more entities to the repository. A hierarchical relationship for the entity relative to other entities may be determined based on a location where a user inserts the entity within the repository. For example, if a user inserts a first entity in a location that corresponds to a child node of a second entity (such as beneath the second entity in a graph-style repository), it may be determined that the first entity and the second entity have a parent-child relationship. Thus, a parent-child threshold may be used for determining whether the first entity and the second entity are duplicates. If the submitted entity is determined to be a duplicate (or a near-duplicate), the submitted entity may be rejected from inclusion in the repository, the user may be given suggestions on how to alter the entity to avoid duplication, and/or the like.

In some embodiments, entities that are identified as potential duplicates (e.g., entities whose similarity scores relative to another entity exceed a threshold) may be evaluated to determine whether they are updated versions or merely redundant copies. Such an evaluation may be performed by a machine learning model such as an LLM (e.g., an LLM that is used to generate suggestions). For example, the machine learning model may analyze two similar entities. The first entity may be determined to be older than the second entity based on metadata associated with the entities. The machine learning model may determine that the second entity contains updated values. For example, the repository may contain a regulatory code, the first entity may be a version of a code section from a prior year, the second entity may be a version of the same code section from the current year, and the machine learning model may determine that the second entity is an updated version of the first entity by evaluating the entities for updated values (e.g., the year may be changed from "2023" to "2024," and so on). In some instances, the machine learning model may determine that the second entity is merely a redundant copy of the first entity or otherwise does not provide new information (e.g., the entities may be the same version of the same code with negligible differences). In such cases, the user may be notified that the second entity is a duplicate, the second entity may be rejected, and/or the like. In instances where the second entity is an updated version of the first entity, the first entity may be removed, flagged for review, and/or the like.

According to certain embodiments, a machine learning model used to generate thresholds and/or a machine learning model used to generate embeddings may be retrained based on user feedback. For example, based on a determination that two entities are duplicates, a user may provide feedback indicating that the entities were not duplicates. One or more parameters of the threshold model and/or the embedding model may be adjusted (e.g., through an iterative training process) based on this feedback, as described above with respect to supervised learning. Also, the thresholds may be adjusted based on the user feedback (e.g., a threshold may be iteratively adjusted upward based on a user indicating that a detected duplicate was not actually a duplicate).

Embodiments of the present disclosure provide numerous technical and practical effects and benefits. By detecting duplicates using different thresholds for similarity based on the hierarchical relationship between entities, embodiments of the present disclosure reduce the number of errors in duplicate entity detection. For instance, entities at different hierarchical levels may be important to a repository even though the entities are similar, whereas similarity between entities at the same hierarchical level may indicate redundancy. Whether two entities are duplicates or not may depend on the particular repository and/or on the particular preferences of users. Embodiments of the present disclosure allow for a duplicate entity detection system to automatically adapt to particular repositories and users. For instance, the thresholds, a model used to generate the thresholds, and/or a model used to generate embeddings of entities may be adjusted/retrained using training data associated with a repository and/or feedback received from a user.

In addition to improving the functioning of duplicate entity detection systems, teachings of the present disclosure also improve the functioning of computer systems generally. For example, by utilizing the improved duplicate entity detection systems disclosed herein, software applications that are associated with electronic repositories will avoid wasting memory and processor resources on storing and processing redundant entities. Additionally, removing such duplicate entities improves the overall user experience; for example, users will not be confused by redundant copies of entities and search results will be improved. Also, when redundant copies of entities from query schemas and other types of computer code are removed, computer programming tasks may be simplified and the underlying computer programs themselves may function better (e.g., fewer errors may occur in executing a program). As another example of achieved improvements to the functioning of computer systems, machine learning models may be more effective when trained with a training data set that contains fewer duplicate entities (e.g., as a result of the improved duplicate entity detection techniques described herein). For example, duplicate items in a training data set may cause training and use of the model to take longer than otherwise necessary and/or require more computing resources than otherwise necessary. Also, semantically ambiguous duplicates may lead to inconsistent results for machine learning tasks (e.g., two documents within the training data may have the same title and purpose but may contain semantically different content, such as content that has been updated from one version of the document to another, which may cause the outputs of a machine learning model to be inconsistent across iterations of the same task). Embodiments of the present disclosure overcome this technical problem through improved duplicate entity detection, thereby avoiding the use of duplicate or near-duplicate entities in machine learning model training data sets.

Example of Computing Components Related to Automated Detection of Duplicate Entities FIG. 1 depicts an example of computing components related to automatic recognition of duplicate entities.

A user 103 may interact with an electronic repository system through a user interface 105. The user interface 105 may allow the user 103 to access a repository over a network 160, such as a cloud computing network or any connection over which data may be transmitted.

A duplicate detection module 100, discussed in further detail below with respect to FIG. 2, may be configured to detect duplicate entities within the repository 150, and/or determine whether an entity provided by user 103 is a duplicate of an entity within the repository 150. The duplicate detection module 100 may include a vector representation generator 110 for generating vector representations (e.g., embedding representations) of entities such as entities within the repository 150 and entities provided by the user 103. The duplicate detection module 100 may also include a comparison module 120, which may be configured to compare vector representations of entities to determine whether the entities are duplicates. The determination may be based on similarity thresholds generated by threshold generator 130, which may be configured to generate hierarchical-relationship-specific thresholds for determining whether two entities are duplicates (e.g., based on training data and/or user feedback). If the level of similarity between two entities exceeds a threshold applicable to the hierarchical relationship between the two entities, the entities may be determined to be duplicates. When a duplicate is detected, response module 140 may be used to provide the user 103 with a response. For example, the response may comprise an indication that an entity is a duplicate (or a near-duplicate). The response may also comprise a natural language response (such as a response generated by populating a prompt or a response generated by a language processing machine learning model trained to generate responses) that includes recommendations for how to avoid duplication (e.g., deleting an entity, editing an entity, and/or the like). In some embodiments, the response module 140 may automatically take action based on detecting a duplicate entity (such as deleting the duplicate entity or blocking the duplicate entity from entry into the repository 150).

Figure 2:
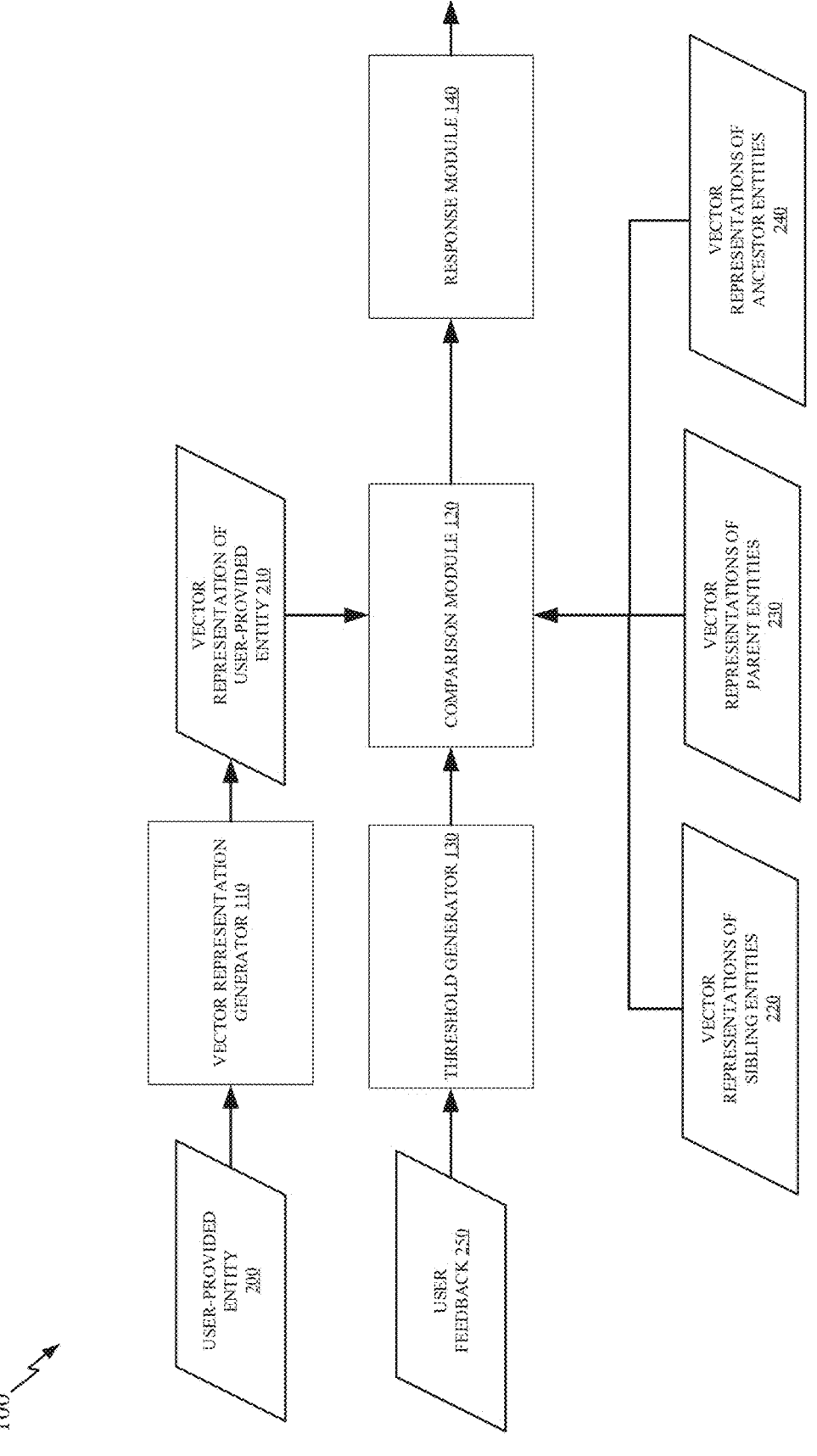
FIG. 2 depicts an additional example of computing components related to automated recognition of duplicate entities.

FIG. 2 is an illustration of additional example computing components related to automatic recognition of duplicate entities. In particular, FIG. 2 shows duplicate detection module 100 of FIG. 1 in greater detail.

A user-provided entity 200 may be provided to a vector representation generator 110. The user-provided entity 200 may generally be any form of electronically stored information, such as a document or a software item (e.g., objects and types in a query language such as GraphQL or other forms of computer code). The user-provided entity 200 may be an entity that the user 103 wants to add to the repository 150.

The vector representation generator 110 may generate a vector representation of the user-provided entity 210 and/or entities within the repository 150. The vector representation generator 110 may comprise one or more processors configured to generate vector representations of entities. In some embodiments, the vector representation may be a binary vector representation that indicates the presence or absence of different words, characters, and/or items in an entity (e.g., "1" may indicate the presence of a word, and "0" may indicate the absence of the word).

In certain embodiments, the vector representation generator 110 may comprise a machine learning model configured to generate embedding representations of entities. A vector representation generated by such a model may comprise an embedding representation. An embedding generally refers to a vector representation of an entity that represents the entity as a vector in n-dimensional space such that similar entities are represented by vectors that are close to one another in the n-dimensional space. The embedding model may comprise a neural network or other type of machine learning model that learns a representation (embedding) for an entity through a training process that trains the neural network based on a data set, such as a plurality of features of a plurality of entities. In one example, the embedding model comprises a Bidirectional Encoder Representations from Transformer (BERT) model, which involves the use of masked language modeling to determine embeddings. In a particular example, the embedding model comprises a Sentence-BERT model. In other embodiments, the embedding model may involve embedding techniques such as Word2Vec and GloVe embeddings. These are included as examples, and other techniques for generating vector representations of entities (such as embedding representations) are possible.

The vector representation of the user-provided entity 210 may be provided to a comparison module 120. The comparison module 120 may be a software component running on one or more processors that is configured to compare vector representations of entities to determine whether the entities are duplicates. The comparison module 120 may compare the vector representation of the user-provided entity 210 to vector representations of entities from the repository 150. This comparison may be performed by calculating the dot product between two embedding vectors, determining the cosine similarity, Jaccard similarity, Euclidean distance, or Levenshtein distance between two embedding vectors, using other types of semantic similarity algorithms, and/or using other techniques for comparing two vectors as known in the art. Such comparison may allow for determining a level of similarity between two entities. If the level of similarity exceeds a threshold, the comparison module 120 may indicate that the entities are duplicates. If the level of similarity is close to the threshold, the comparison module 120 may indicate that the entities are near-duplicates As discussed in further detail below with respect to FIG. 3, the repository 150 may have a hierarchical structure such that certain entities within the repository 150 correspond to parent nodes, and certain entities correspond to child nodes. Additionally, certain entities may correspond to ancestor nodes, which are nodes other than parent nodes from which a child node descends. If two entities have a sibling relationship (e.g., the nodes share a common parent node), the comparison module 120 may use a sibling threshold to determine whether the entities are duplicates. If two entities have a parent-child relationship (e.g., one entity is a parent node of the other entity), the comparison module 120 may use a parent-child threshold to determine whether the entities are duplicates. If two entities have an ancestor relationship (e.g., one entity is a descendant, but not a child, of the other entity), the comparison module 120 may use an ancestor threshold to determine whether the entities are duplicates. The sibling threshold may be used for comparing the vector representation of the user-provided entity 210 and the vector representations of sibling entities 220 of the user-provided entity. The parent-child threshold may be used for comparing the vector representation of the user-provided entity 210 and the vector representations of parent entities 230 of the user-provided entity (or child entities in cases where the user-provided entity 210 is a parent entity). The ancestor threshold may be used for comparing the vector representation of the user-provided entity 210 and the vector representations of ancestor entities 240 of the user-provided entity (or descendant entities in cases where the user-provided entity 210 is an ancestor entity).

The thresholds may be generated by a threshold generator 130. Threshold generator may include a machine learning model such as a large language model (LLM) that is trained to generate thresholds for detecting duplicate entities through a supervised learning process. Supervised learning techniques generally involve providing training inputs to a machine learning model. The machine learning model processes the training inputs and outputs predictions based on the training inputs. The predictions are compared to the known labels associated with the training inputs to determine the accuracy of the machine learning model, and parameters of the machine learning model are iteratively adjusted until one or more conditions are met. For instance, the one or more conditions may relate to an objective function (e.g., a cost function or loss function) for optimizing one or more variables (e.g., model accuracy). In some embodiments, the conditions may relate to whether the predictions produced by the machine learning model based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and/or the like. In some embodiments, validation and testing are also performed for a machine learning model, such as based on validation data and test data, as is known in the art.

The supervised learning process for threshold generator 130 may involve a training data set that comprises a hierarchical repository with labels that indicate whether entities within the repository are duplicates of one another. Variables of the threshold generator 130 may be adjusted based on a variance between training labels and predictions made by the threshold generator 130. For example, the training repository may include a parent entity and a child entity. These entities may be labeled as duplicates, near-duplicates, or unique. A degree of similarity may have been calculated for the pair of entities (such as by comparison module 120). The threshold generator 130 may output a prediction based on the calculated degree of similarity (e.g., the threshold generator may output a threshold, and the entities may be predicted to be duplicates if the degree of similarity exceeds the threshold). If the threshold generator 130 outputs a prediction that the parent entity and child entity are not duplicates based on the degree of similarity calculated for the pair of entities, parameters of the threshold generator 130 may be adjusted. The trained threshold generator 130 may then output a prediction that the two entities are duplicates. Similarly, parameters of the threshold generator 130 may be adjusted if the threshold generator 130 predicts that two entities are duplicates when the entities are not labeled as duplicates. By making such adjustments to the parameters of threshold generator 130, a parent-child threshold may be generated that allows for more accurate determinations as to whether two entities are duplicates. The supervised learning process may also be used to train the threshold generator 130 to generate sibling thresholds and ancestor thresholds. In some embodiments, the thresholds may be iteratively adjusted based on the training repositories with or without using a machine learning model. For example, a threshold may be iteratively adjusted upward if the degree of similarity exceeds the threshold and a label indicates that the two entities are not duplicates. As another example, a threshold may be iteratively adjusted downward if the degree of similarity does not exceed the threshold and a label indicates that the two entities are duplicates. In embodiments where a machine learning model is used to adjust the parameters, retraining the machine learning model (e.g., based on training data or user feedback) may comprise adjusting the temperature of the machine learning model (e.g., the iterative adjustments may be smaller/less aggressive or larger/more aggressive).

In embodiments where vector representation generator 110 comprises a machine learning model that generates embeddings, vector representation generator 110 may be trained through a similar supervised learning process. For example, if the embedding representations result in a relatively high calculated level of similarity between two entities that were not labeled as duplicates, then parameters of vector representation generator 110 may be adjusted (e.g., the granularity of the embeddings may be adjusted). Similarly, if the embedding representations result in a relatively low calculated level of similarity between two entities that were labeled as duplicates, then parameters of vector representation generator 110 may be adjusted.

Notably, using a machine learning model to determine hierarchical-relationship-specific thresholds (e.g., rather than using a machine learning model to directly predict whether entities are duplicates of each other in all cases)

enables such thresholds to be used to determine whether entities are duplicates of one another in a plurality of cases without using the machine learning model directly for each such determination (e.g., because the thresholds can be determined once using the machine learning model and used many times, such as until a threshold is updated), thereby avoiding the computing resource utilization that would otherwise be required to use a machine learning model for every individual duplicate determination. Comparing embeddings of two entities to determine a similarity measure and comparing the similarity measure to a threshold generally involves substantially less computing resource utilization than executing a machine learning model.

In response to identified duplicates, the user 103 may provide user feedback 250. User feedback 250 may comprise an indication as to whether an entity is a duplicate entity. For example, one or more entities may be flagged as duplicates. The user 103 may indicate that one or more of the flagged entities are not actually duplicates. Or, the user 103 may indicate that an entity that was not flagged as a duplicate is a duplicate. Such feedback may be in the form of a user 103 selecting an answer to a multiple choice question regarding the identification of duplicate entities. In some embodiments, the feedback may be natural language feedback processed by a language processing machine learning model such as an LLM. Processing the feedback may comprise inferring an indication regarding the accuracy of the duplicate detection system. Based on this feedback, the vector representation generator 110 and/or threshold generator 130 may be retrained, and/or the thresholds may be adjusted.

If comparison module 120 indicates that two entities are duplicates, response module 140 may generate a response to provide to the user 103. Response module 140 may comprise one or more processors that are configured to perform actions in response to detected duplicates such as providing the user 103 an indication that an entity is a duplicate or providing recommendations to the user 103. In some embodiments, response module comprises a machine learning model such as an LLM that is trained to generate responses. A response generated by such a machine learning model may comprise natural language suggestions for how to modify a duplicate entity based on the results of a similarity comparison. For example, if a similarity comparison indicates that a particular portion of an entity is a duplicate of an entity (or a portion of an entity) within the repository 150, then the response may suggest that the user 103 delete or modify the particular portion of the entity. The response may also be generated based on an indication that two entities are near-duplicates (e.g., the level of similarity is close to the threshold). A response regarding near-duplicate entities may involve asking the user 103 to confirm whether the entities are duplicates. In some embodiments, the response module 140 may determine that a second entity is an updated version of a first entity and replace the first entity with the second entity (or present the user 103 with a suggestion to replace the first entity with the second entity).

Example of a Hierarchical Repository for Storing Entities

Figure 3:
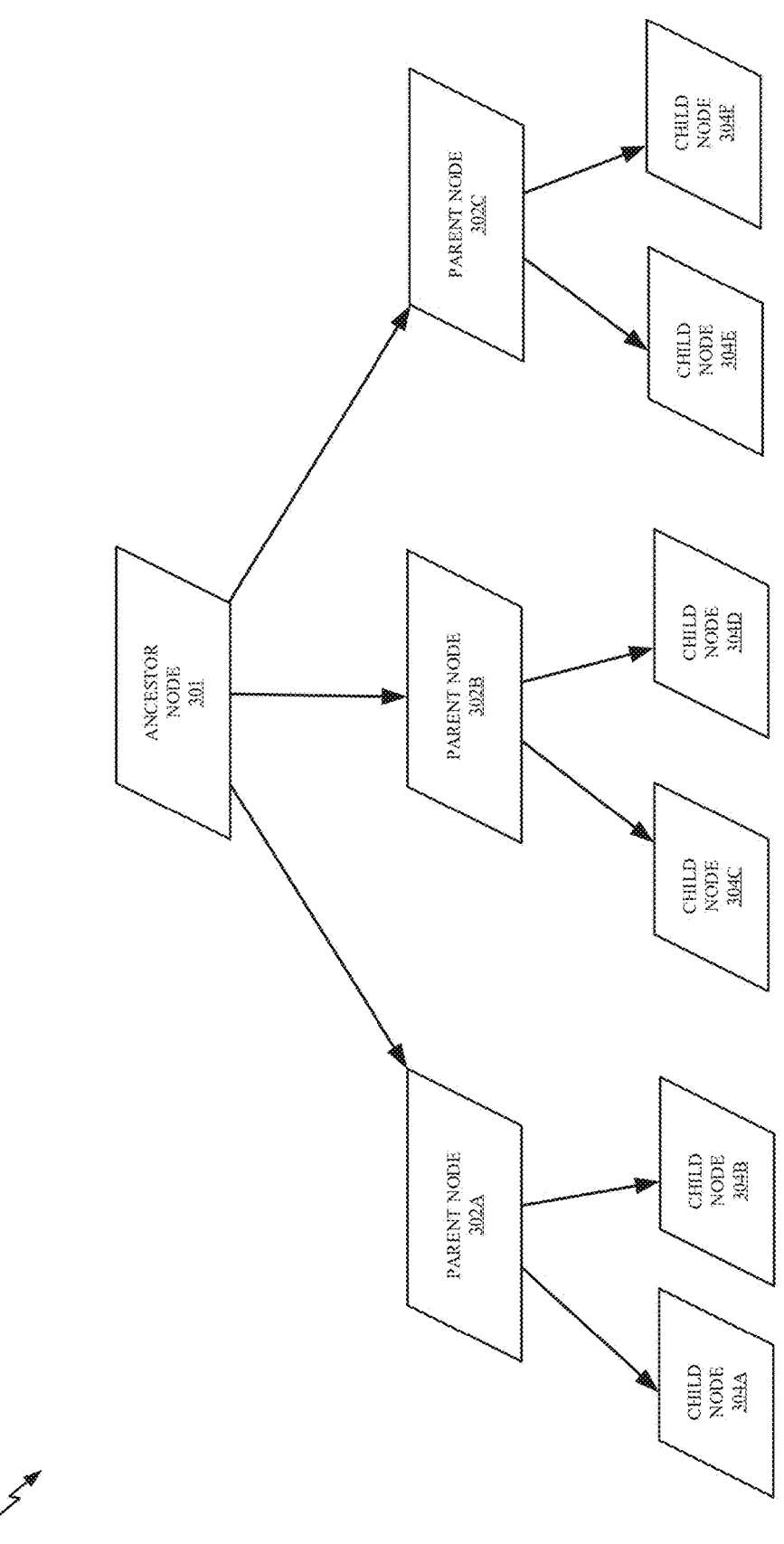
FIG. 3 depicts an example of a hierarchical repository for storing entities.

FIG. 3 depicts an example of a hierarchical repository 150 for storing entities.

As shown in FIG. 3, the repository 150 may be a set of entities arranged in a data tree structure. Each node of the data tree may correspond to an entity within the repository 150, such as a document or a software item.

Ancestor node 301 is a parent node to parent nodes 302A, 302B, and 302C. Ancestor node 301 is an ancestor node to the child nodes 304A-F. Parent node 302A is a parent node to child nodes 304A and 304B. Parent nodes 302B and 302C are also parent nodes to various child nodes. Parent node 302A is considered a parent node of child node 304A because child node 304A branches from parent node 302A in the repository 150. Ancestor node 301 is considered an ancestor node of child node 304A because child node 304A "descends" from ancestor node 301, but ancestor node 301 is not the parent node of child node 304A. In this example, if ancestor node 301 had a parent node, this node would be an ancestor node to parent nodes 302A-C and child nodes 304A-F.

A user-provided entity 200 may be inserted at any level of the repository 150. For example, a user-provided entity 200 may be inserted as ancestor node 301. In this example, a parent-child threshold may be used to compare the user-provided entity 200 to parent node 302A, and an ancestor threshold may be used to compare the user-provided entity 200 to child node 304A.

As another example, a user-provided entity 200 may be inserted as parent node 302B. In this example, a parent-child threshold may be used to compare the user-provided entity 200 to child node 304C or ancestor node 301. A sibling threshold may be used to compare the user-provided entity 200 to parent nodes 302A or 302.

As an additional example, a user-provided entity 200 may be inserted as child node 304F. In this example, a parent-child threshold may be used to compare the user-provided entity 200 to parent node 302C. An ancestor threshold may be used to compare the user-provided entity 200 to ancestor node 301. A sibling threshold may be used to compare the user-provided entity 200 to child node 304E. In embodiments where the repository 150 does not have a hierarchical structure (not shown), the sibling threshold may be used for comparing the entities within the repository. As discussed in greater detail above, if a user-provided entity 200 is determined to be a duplicate, one or more actions may be taken such as blocking the user-provided entity 200 from being included in the repository 150.

In an example embodiment, the nodes of repository 150 may correspond to pages or documents on a website. For example, ancestor node 301 may be a home page of the website. Parent nodes 302A-C may be webpages within the website that correspond to various topics. Child nodes 304A-F may be webpages that provide more detail regarding the topic of a respective parent webpage.

In another example embodiment, the nodes of repository 150 may correspond to software items such as software application code. For example, ancestor node 301 may be the main code of a computer program. Parent nodes 302A-C may be functions within the main code. Child nodes 304A-F may be objects or types used by the functions and/or the main code. For instance, a query schema (e.g., written in GraphQL or another type of query language) may comprise a main body of code, which may correspond to ancestor node 301. A function used within the query schema may be represented as parent node 302A. The definition of a type used by the function may be represented by child node 304B.

Example Operations Related to Automated Recognition of Duplicate Entities

FIG. 4 depicts example operations 400 related to detecting hallucinations in language model outputs. For example, operations 400 may be performed by one or more of the components described with respect to FIG. 1 or FIG. 2.

Operations 400 begin at step 402 with generating a vector representation of a given entity. According to certain embodiments, the vector representations of the given entity and the plurality of entities comprise embedding representations generated by an embedding model, wherein the embedding model is retrained based on user feedback.

Operations 400 continue at step 404 with comparing the vector representation of the given entity to vector representations of a plurality of entities within a repository to determine a level of similarity for the given entity relative to each of the plurality of entities. In certain embodiments, the comparing is based on applying a semantic similarity algorithm to the vector representation of the given entity and the vector representation of the particular entity.

Operations 400 continue at step 406 with selecting a similarity threshold of a set of similarity thresholds for the given entity and a particular entity based on a hierarchical relationship between the given entity and the particular entity, wherein the set of similarity thresholds comprises a sibling threshold, a parent-child threshold, and an ancestor threshold. In some embodiments, the set of similarity thresholds are generated using a machine learning model that is trained through a supervised learning process involving a training data set comprising entities that are labeled as duplicates. Certain embodiments provide that the machine learning model is retrained based on user feedback with respect to the determining. Some embodiments provide that the hierarchical relationship between the given entity and the particular entity is determined based on a location within the repository where a user inserts the given entity. In certain embodiments, based on a determination that no hierarchical structure exists for the repository, the sibling threshold is selected for determining whether the given entity is a duplicate of the particular entity. According to certain embodiments, the sibling threshold is selected based on the given entity and the particular entity having a common parent entity. Some embodiments provide that the parent-child threshold is selected based on: the given entity being linked as a child node to the particular entity; or the particular entity being linked as a child node to the given entity. In certain embodiments, the ancestor threshold is selected based on: the given entity being linked as a child node to a node that is a descendant of the particular entity; or the particular entity being linked as a child node to a node that is a descendant of the given entity.

Operations 400 continue at step 408 with determining that the given entity is a duplicate of the particular entity based on a level of similarity between the given entity and the particular entity exceeding the selected similarity threshold. According to some embodiments, a response is generated by a language processing machine learning model and provided to a user based on the determining, wherein the response comprises suggestions regarding the given entity.

Figure 5:
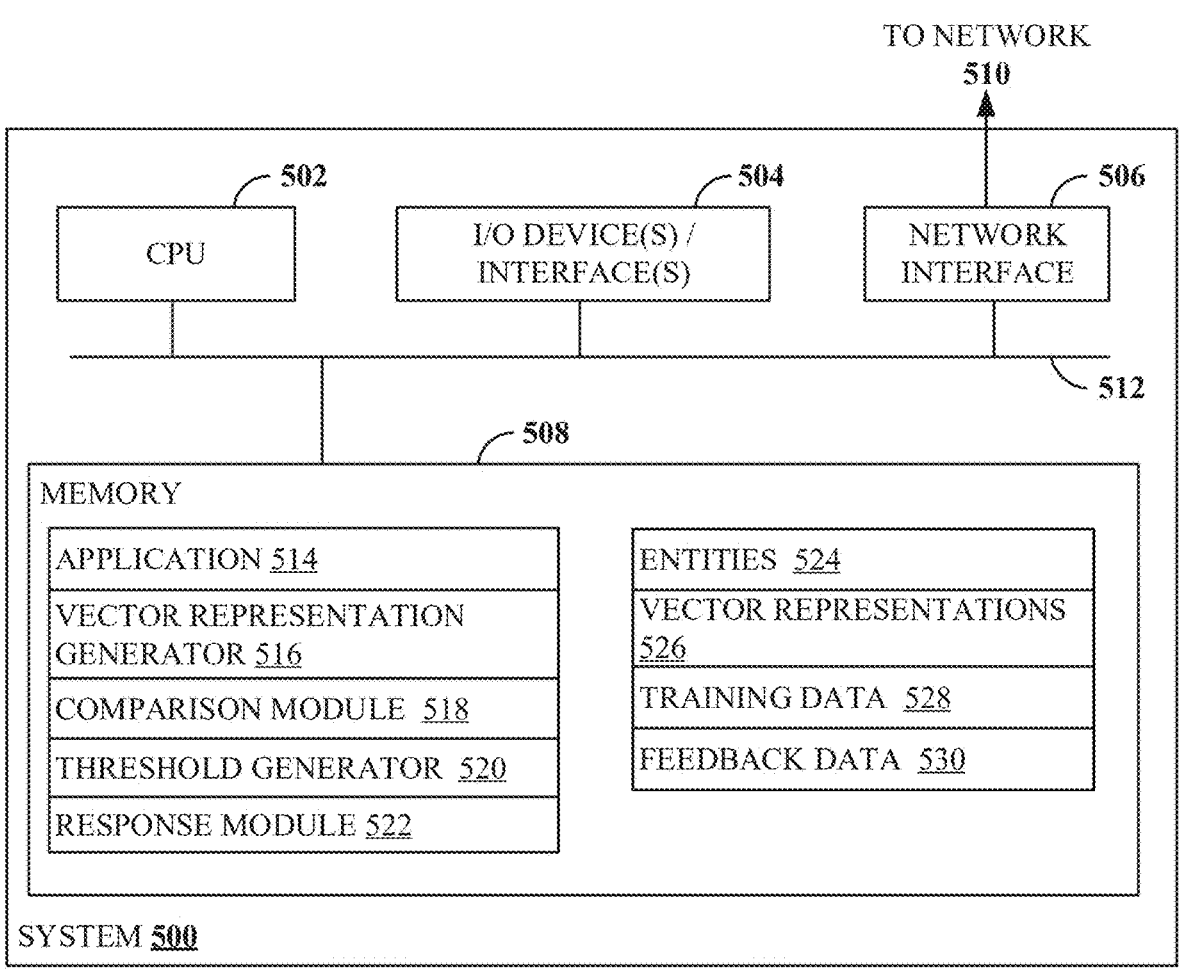
FIG. 5 depicts an example of a processing system for automated recognition of duplicate entities.

Example of a Processing System for Automated Recognition of Duplicate Entities FIG. 5 illustrates an example system 500 with which embodiments of the present disclosure may be implemented. For example, system 500 may be configured to perform operations 400 of FIG. 4 and/or to implement one or more components as in FIG. 1 or FIG. 2.

System 500 includes a central processing unit (CPU) 502, one or more I/O device interfaces that may allow for the connection of various I/O devices 504 (e.g., keyboards, displays, mouse devices, pen input, etc.) to the system 500, network interface 506, a memory 508, and an interconnect 512. It is contemplated that one or more components of system 500 may be located remotely and accessed via a network 510. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes application 514, vector representation generator 516, comparison module 518, threshold generator 520, and response module 522. Application 514 may be representative of an application used for accessing a repository and adding entities to a repository. In some embodiments, vector representation generator 516 may be representative of vector representation generator 110 of FIG. 1 and FIG. 2. Comparison module 518 may be representative of comparison module 120 of FIG. 1 and FIG. 2. Threshold generator 520 may be representative of threshold generator 130 of FIG. 1 and FIG. 2. Response module 522 may be representative of response module 140 of FIG. 1 and FIG. 2.

Memory 508 further comprises entities 524, which may correspond to user-provided entity 200 of FIG. 2 or entities within a repository. Memory 508 further comprises vector representations 526 which may correspond to vector representation of user-provided entity 210, vector representations of sibling entities 220, vector representations of parent entities 230, or vector representations of ancestor entities 240 of FIG. 2. Memory 508 further comprises training data 528, which may include training data used to train vector representation generator 516 or threshold generator 520. Memory 508 further comprises feedback data 530, which may correspond to user feedback 250 of FIG. 2.

It is noted that in some embodiments, system 500 may interact with one or more external components, such as via network 510, in order to retrieve data and/or perform operations.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for detecting duplicate entities in a repository, comprising:
    generating embedding representations of a given set of entities based on providing the given set of entities as input to an embedding model;
    storing a first entity in the repository based on an embedding representation of the first entity of the given set of entities that has a parent-child relationship with a particular entity having a level of semantic similarity with respect to an embedding representation of the particular entity that does not exceed a parent-child threshold; and
    removing a second entity from the repository based on an embedding representation of the second entity of the given set of entities that has a sibling relationship with the particular entity having a level of semantic similarity with respect to the embedding representation of the particular entity that exceeds a sibling threshold.

2. The method of claim 1, wherein the parent-child threshold and the sibling threshold are generated using a machine learning model that is trained through a supervised learning process involving a training data set comprising entities that are labeled as duplicates.

3. The method of claim 2, wherein the machine learning model is retrained based on user feedback with respect to the storing and the removing.

4. The method of claim 1, wherein the embedding model is retrained based on user feedback.

5. The method of claim 1, wherein a response is generated by a language processing machine learning model and provided to a user based on the removing, wherein the response comprises suggestions regarding the second entity.

6. The method of claim 1, wherein it is determined that the first entity and the particular entity have a parent-child relationship based on a location within the repository where a user inserts the first entity.

7. The method of claim 1, wherein the sibling threshold is used for entities having a common parent entity, wherein it is determined that the second entity and the particular entity have a sibling relationship based on the second entity and the particular entity having a common parent entity.

8. The method of claim 1, further comprising storing a third entity in the repository based on an embedding representation of the first entity of the given set of entities that has an ancestor relationship with the particular entity having a level of semantic similarity with respect to the embedding representation of the particular entity that does not exceed an ancestor threshold.

9. The method of claim 1,
    further comprising deleting a fourth entity from the repository based on an embedding representation of the fourth entity of the given set of entities that has an ancestor relationship with the particular entity having a level of semantic similarity with respect to the embedding representation of the particular entity that exceeds an ancestor threshold.

10. The method of claim 1, wherein the sibling threshold is lower than the parent-child threshold.

11. A system for detecting duplicate entities in a repository, comprising:
    one or more processors; and
    a memory comprising instructions that, when executed by the one or more processors, cause the system to:
    generate embedding representations of a given set of entities based on providing the given set of entities as input to an embedding model;
    store a first entity in the repository based on an embedding representation of the first entity of the given set of entities that has a parent-child relationship with a particular entity having a level of semantic similarity with respect to an embedding representation of the particular entity that does not exceed a parent-child threshold; and
    remove a second entity from the repository based on an embedding representation of the second entity of the given set of entities that has a sibling relationship with the particular entity having a level of semantic similarity with respect to the embedding representation of the particular entity that exceeds a sibling threshold.

12. The system of claim 11, wherein the parent-child threshold and the sibling threshold are generated using a machine learning model that is trained through a supervised learning process involving a training data set comprising entities that are labeled as duplicates.

13. The system of claim 12, wherein the machine learning model is retrained based on user feedback with respect to the storing and the removing.

14. The system of claim 11, wherein the embedding model is retrained based on user feedback.

15. The system of claim 11, wherein a response is generated by a language processing machine learning model and provided to a user based on the removing, wherein the response comprises suggestions regarding the second entity.

16. The system of claim 11, wherein the sibling threshold is used for entities having a common parent entity, wherein it is determined that the second entity and the particular entity have a sibling relationship based on the second entity and the particular entity having a common parent entity.

17. The system of claim 11, further comprising storing a third entity in the repository based on an embedding representation of the first entity of the given set of entities that has an ancestor relationship with the particular entity having a level of semantic similarity with respect to the embedding representation of the particular entity that does not exceed an ancestor threshold.

18. A non-transitory computer readable medium comprising instructions that, when executed by one or more processors of a computing system, cause the computing system to:

generate embedding representations of a given set of entities based on providing the given set of entities as input to an embedding model;

store a first entity in a repository based on an embedding representation of the first entity of the given set of entities that has a parent-child relationship with a particular entity having a level of semantic similarity with respect to an embedding representation of the particular entity that does not exceed a parent-child threshold;

remove a second entity from the repository based on an embedding representation of the second entity of the given set of entities that has a sibling relationship with the particular entity having a level of semantic similarity with respect to the embedding representation of the particular entity that exceeds a sibling threshold; and using entities stored in the repository as a training data set for training a machine learning model.

\* \* \* \* \*